United States Patent

Omoto et al.

[11] Patent Number: 5,310,241
[45] Date of Patent: May 10, 1994

[54] FLEXIBLE TOP VEHICLE

[75] Inventors: Seiichi Omoto; Kenji Matsumoto, both of Hiroshima, Japan

[73] Assignee: Mazda Motor Corporation, Hiroshima, Japan

[21] Appl. No.: 824,736

[22] Filed: Jan. 21, 1992

Related U.S. Application Data

[63] Continuation of Ser. No. 601,133, Oct. 23, 1990, abandoned.

[30] Foreign Application Priority Data

Oct. 23, 1989 [JP] Japan ................... 1-276239

[51] Int. Cl.$^5$ .......................... B60J 7/12; B60J 7/185
[52] U.S. Cl. .................................... 296/219; 296/224
[58] Field of Search ............................... 296/219, 224

[56] References Cited

U.S. PATENT DOCUMENTS

| | | | |
|---|---|---|---|
| 2,025,874 | 12/1935 | Lange | 296/219 |
| 2,103,372 | 12/1937 | Lange | 296/219 |
| 4,830,428 | 5/1989 | Masuda et al. | 296/220 X |
| 5,080,429 | 1/1992 | Omoto et al. | 296/219 |

FOREIGN PATENT DOCUMENTS

| | | | |
|---|---|---|---|
| 0347859 | 12/1989 | European Pat. Off. | 296/219 |
| 0031819 | 2/1988 | Japan | 296/219 |
| 0112217 | 5/1988 | Japan | 296/219 |
| 0257627 | 10/1989 | Japan | 296/219 |
| 165013 | 1/1934 | Switzerland | 296/219 |

*Primary Examiner*—Dennis H. Pedder
*Attorney, Agent, or Firm*—Fish & Richardson

[57] ABSTRACT

Disclosed is a flexible top vehicle with its flexible top so disposed as to open or close both the forward portion and the rearward portion of a roof opening separately. The flexible top is disposed at the roof opening portion and it has a forward slider disposed at its forward end portion and a rearward slider disposed at its rearward end portion, thereby capable of opening the forward and/or rearward portion of the roof opening of the roof by folding or extending the flexible top from or to both end portions thereof. The forward slider is engaged with a forward stopper mounted on a member of the vehicle body, thereby closing the forward portion of the roof opening with the forward end portion of the flexible top, and vice versa. When the flexible top is extended to its maximum length and closes the entire length of the roof opening, the distance between the forward and rearward sliders is set to be smaller than the distance between the forward and rearward stoppers. This acts to maintain the flexible top at its maximum extended length, in which the flexible top is under forward and backward tension, thus keeping the flexible top from extending or otherwise loosely hanging downward due to a rise in temperature or to other causes.

15 Claims, 7 Drawing Sheets

FLEXIBLE TOP VEHICLE

This application is a continuation of U.S. application Ser. No. 07/601,133, filed Oct. 23, 1990, now abandoned.

BACKGROUND OF THE INVENTION

1. Field of the Invention

The present invention relates to a flexible top vehicle or a canvas top vehicle, or a vehicle with a flexible top or with a canvas top, and, more particularly, to a flexible top vehicle in which the flexible top composed of a flexible member is so disposed as to open or cover a roof opening of the roof by folding or extending the flexible top from or to both end portions thereof.

2. Description of Related Art

A canvas top vehicle, or a flexible top vehicle, is known which has a roof opening at a central portion of a roof of the vehicle body, which is surrounded by a front header, a rear header, and roof side rails and which has a canvas top or a flexible top, composed of a flexible sheet material, disposed so as to be foldable or windable to thereby open or cover the roof opening of the roof.

Such a canvas top vehicle is designed such that the canvas top or flexible top is generally accommodated in a backward position of the roof. The flexible top disposed at the roof opening of the roof of the vehicle body is arranged such that a rearward end of the flexible top is fixed to the rear header of the roof opening and a forward portion of the flexible top is folded or extended in a longitudinal direction of the vehicle body, thereby transferring the flexible top rearwards or forwards and opening or closing the roof opening of the roof of the vehicle body. More specifically, the roof opening is fully closed by bringing the front end of the flexible top into abutment with the front header of the roof opening, thereby extending the flexible top to its maximum extent and covering the roof opening thereof to a full closed extent with the flexible top. When the front end of the flexible top is transferred backwards toward the rear header of the roof opening, the forward end portion of the flexible top is folded or wound in order from its front end thereof. When the flexible top has been folded or wound up to a position in the vicinity of the rear header, the roof opening is almost opened.

Japanese Unexamined Patent Publication (kokai) No. 37,531/1986 discloses such a canvas top vehicle as having the construction as generally described hereinabove, which is further designed such that the flexible top in a folded or wound state is extended forwards from its front end to its maximum extended length by manual operation. This technology improves appearance and sealing performance between the roof and the flexible top due to tension applied to the flexible top in a closed state in the longitudinal direction of the vehicle body. Likewise, U.K. Patent Specification No. 1,011,473 discloses technology which involves tilting a front end of the canvas top upwards when the canvas top is opened from the state in which the roof opening is full closed or tilting the front end of the canvas top downwards when the canvas top is fully closed. This technology relates to tilting the front end of the canvas top downwards and forcing the front end thereof to be engaged with a sealing member disposed on the front header of the roof opening, thereby ensuring sealing performance between the front end of the canvas top and the front header thereof. On the other hand, when the front end of the canvas top is tilted upwards from the state in which the canvas top fully closes the roof opening and as a consequence the front end thereof is disengaged from the sealing member, the forward end portion of the canvas top can smoothly be transferred backwards. The technology of tilting the front end of the canvas top upwards or downwards, as disclosed in this U.K. patent specification, is based on manual operation.

U.S. Pat. No. 2,103,372 discloses another type of a canvas top car, which is so designed as to allow its canvas top to be opened or closed from or to both end portions in the longitudinal direction of the vehicle body. More specifically, both of a forward end portion and a rearward end portion of the canvas top can be opened, thereby opening both the forward portion and the rearward portion of the roof opening of the roof. For the canvas top vehicle of this type, the canvas top in a folded or wound state is disposed in a central position in the longitudinal direction of the vehicle body. This type of the canvas top vehicle also can provide passengers seated in the back with open feeling over their heads as well as those seated on front seats.

It is to be noted, however, that the canvas top vehicle of the type capable of opening the canvas top from both of the front and rear ends suffers from the disadvantages that, when the length of the canvas top is set, for example, so as to correspond to a distance between the positions in which both forward and rearward ends of the canvas top are fully closed, i.e., to a length between a forward stopper and a rearward stopper for locking the respectively front end and rear end of the canvas top, and when the canvas top is extended in the longitudinal direction of the vehicle body to its maximum length so as to fully close the roof opening of the roof, the canvas top may hang loosely because the canvas top may be transformed to a size longer than its original size due to a rise in temperature or for other causes. Such a transformation of the flexible top can impair or spoil appearance and sealing performance.

SUMMARY OF THE INVENTION

Therefore, the present invention has the object to provide a flexible top vehicle with its flexible top so disposed as to open or close both of or either one of its forward end portion and/or its rearward end portion, in which the flexible top can be extended to its maximum length when the flexible top is in such a state of closing a roof opening of a roof of the vehicle body.

The present invention has another object to provide a flexible top vehicle with its flexible top so disposed as to open or close both of or either one of its forward end portion and/or its rearward end portion, in which the flexibl top can be extended to its maximum length even if either of the forward end portion or the rearward end portion of the flexible top is closed prior to the other.

In order to achieve the objects as described hereinabove, the present invention consists of a flexible top vehicle having a roof with a roof opening formed thereon and surrounded by a front header, a rear header and roof side rails; and a flexible top composed of a flexible material and disposed at the roof opening; wherein the flexible top is so disposed as to assume a full closed state in which the roof opening is fully covered with the flexible top by extending the flexible top to its full extended length in a longitudinal direction of a vehicle body and to assume an open state in which the roof opening is partially opened by folding the flexible top in the longitudinal direction thereof; comprising:

a first guide rail so disposed to said roof side rail as to extend in the longitudinal direction thereof;

a forward sliding member so disposed at a forward end portion of said flexible top as to be slidably transferred in the longitudinal direction thereof by guidance of said first guide rail;

a rearward sliding member so disposed at a rearward end portion of said flexible top as to be slidably transferred in the longitudinal direction thereof by guidance of said first guide rail;

a forward stopper means so disposed at a front end of said first guide rail as to receive said forward sliding member, thereby allowing the forward end portion of said flexible top to assume a closed forward state in which a forward portion of said roof opening is covered with the forward end portion of said flexible top; and a rearward stopper means so disposed at a rear end of said first guide rail as to receive said rearward sliding member, thereby allowing the rearward end portion of said flexible top to assume a closed rearward state in which a rearward portion of said roof opening is covered with the rearward end portion of said flexible top;

wherein a distance L1 between said forward stopper means and said rearward stopper means is set to be longer than a maximum distance L2 between said forward sliding means and said rearward sliding means when said flexible top is extended to its longest possible extent enough to cover said roof opening.

This arrangement for the construction of the flexible top vehicle according to the present invention, as described hereinabove, enables an extension of the flexible top due to a rise in temperature or for other causes to be absorbed without the flexible top hanging loose, thereby ensuring the maximum extended length of the flexible top, because the distance between the forward and rearward sliding members disposed on the flexible top is preset to be smaller than the distance between the forward and rearward stopper means.

Further, for the flexible top vehicle according to the present invention, a forward locking mechanism disposed at the forward stopper means and a rearward locking mechanism disposed at the rearward stopper means can lock the forward end portion and the rearward end portion of the flexible top, respectively, due to the tension acting upon of the flexible top, when the opposite end portion of the flexible top is operatively closed. More specifically, for instance, when the rearward end portion of the flexible top starts being transferred backwards in order to close the rearward portion of the roof opening of the roof in such a state in which the forward end portion of the flexible top is closed, the tension produced by pulling the rearward end portion of the flexible top rearwards acts upon the forward end portion of the flexible top in such a manner to pull the forward end portion thereof rearwards, too. This tension serves as engaging the front end of the flexible top with the forward locking mechanism and locking it in association therewith. In other words, when the rear end of the flexible top is transferred backwards in order to close the rearward portion of the roof opening, the forward end of the flexible top is locked to thereby allow the flexible top to be closed to a full extent.

Other objects, features and advantages of the present invention will become apparent in the course of the description of the preferred embodiments, which follows, in conjunction with the accompanying drawings.

DESCRIPTION OF THE PREFERRED EMBODIMENTS

The present invention will be described more in detail in conjunction with the accompanying drawings.

Figure 1:
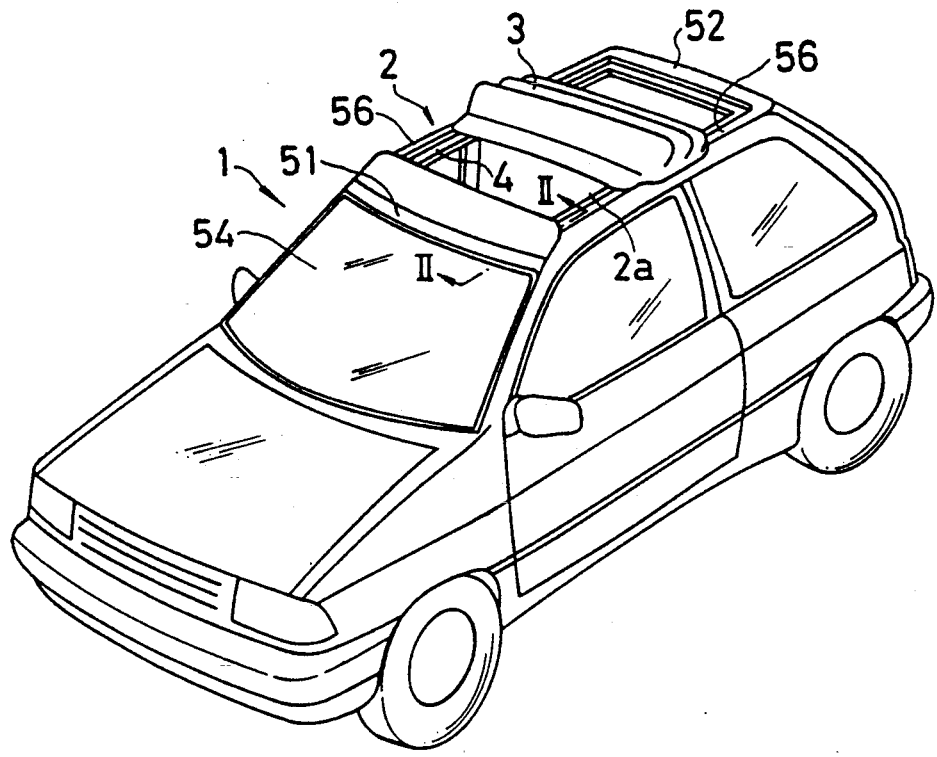
FIG. 1 is a perspective view showing a flexible top vehicle to which the present invention is applied.

As shown in FIG. 1, reference numeral 1 denotes a flexible top vehicle or canvas top vehicle, or a vehicle with a flexible top or canvas top, which is provided on its roof 2 with a roof opening 2a so designed as to be opened or closed by folding or expanding a flexible top 3 made of a flexible member. More specifically, the roof 2 has the roof opening 2a which is defined and surrounded by a front header 51, a rear header 52 and a pair of roof side rails 56, 56. To the roof opening 2a is mounted a frame member 4 corresponding to the front header 51, the rear header 52 and the roof side rails 56, 56, and both longitudinal sides of the frame member comprise guide rails 5, 5, as shown in FIGS. 2 and 3, along which the flexible top 3 is arranged so as to be foldable or expandable in the longitudinal direction of the vehicle body, thereby opening or closing a forward portion of the roof opening 2a of the roof 2 or opening or closing a rearward portion of the roof opening 2a thereof.

Figure 2:
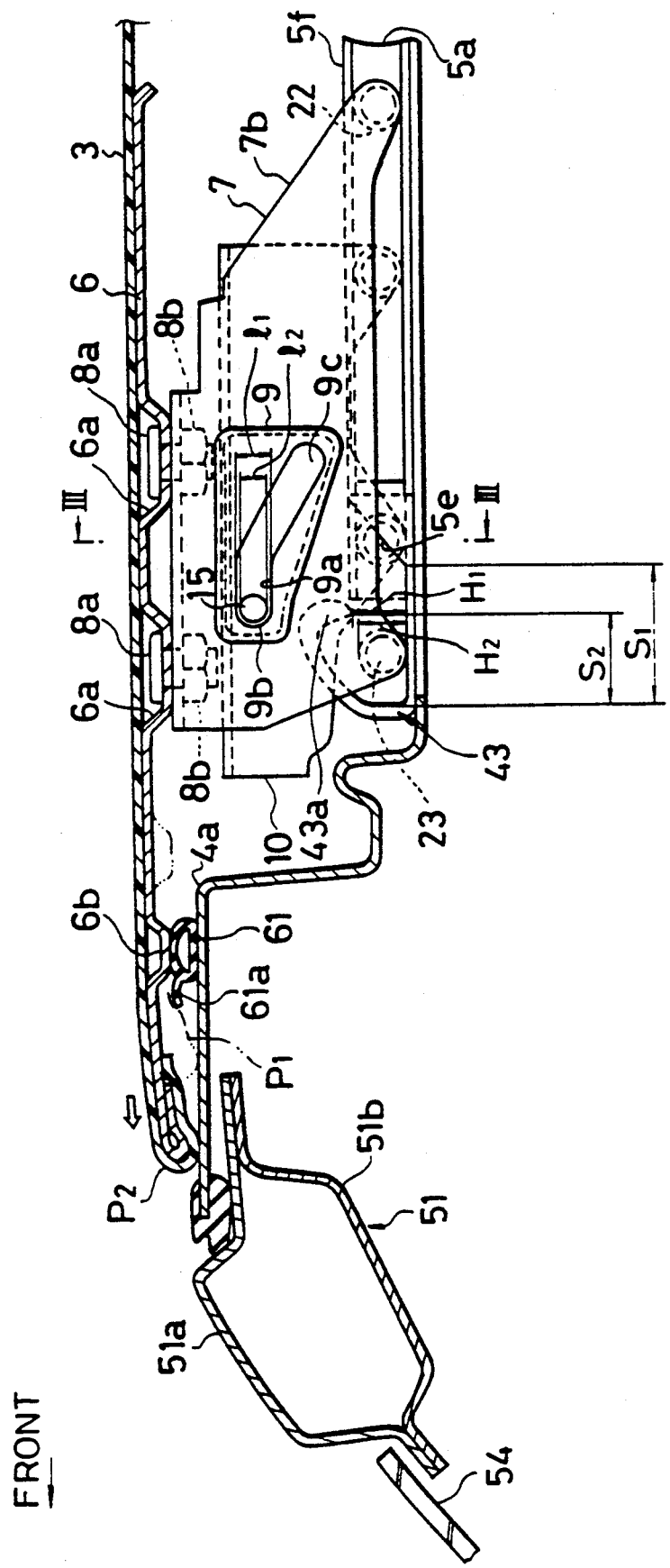
FIG. 2 is a sectional view showing the forward portion of the flexible top vehicle when taken along the line II—II of FIG. 1.
Figure 3:
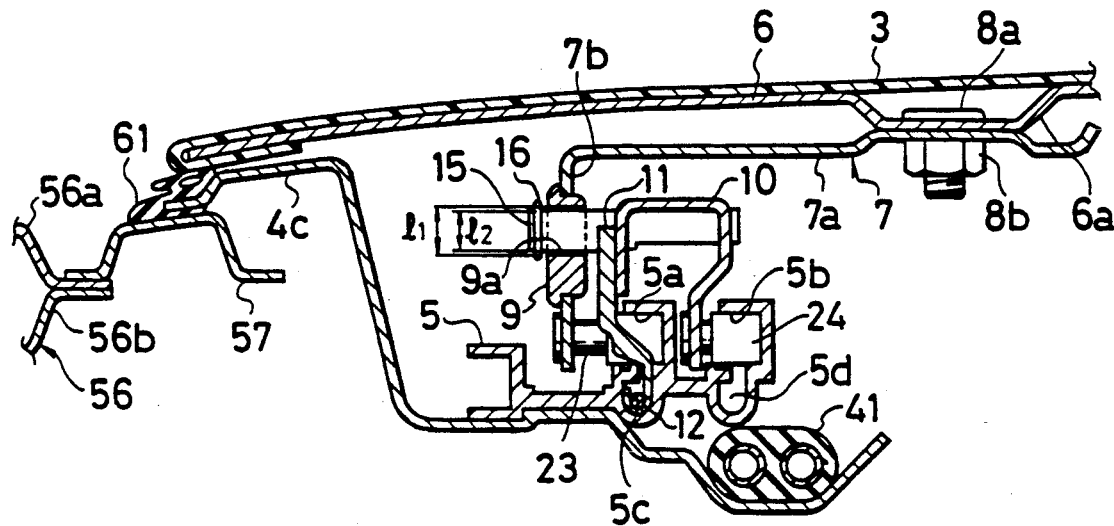
FIG. 3 is a sectional view of the forward portion of the flexible top vehicle, when taken along the line III—III of FIG. 2.

As shown specifically in FIGS. 2 and 3, the flexible top 3 is connected at its forward end portion to a forward plate member 6 made of a hard material, which has mounting sections 6a and 6a on the left-hand and right-hand side portions of the forward plate member 6. To the left-hand and right-hand mounting sections 6a and 6a is mounted and fixed a mounting bracket 7 with bolts 8a and 8a and respective nuts 8b and 8b. As shown more specifically in FIG. 3, the mounting bracket 7 comprises a base section 7a and a support section 7b, the base section 7a being secured to the mounting sections 6a and 6a and the support section 7b being so constructed as to extend downwards at its outer edge of the base section 7a. To the support section 7b is secured a cam member 9 having a cam groove 9a which in turn comprises a horizontal groove section 9b extending in an approximately horizontal direction and an inclined groove section 9c being continuously disposed in a position rearward of the horizontal groove section 9b and extending in a diagonally rearward and downward direction of the vehicle body, as shown specifically in FIG. 2.

FIG. 3 further illustrates the mounting bracket 7 which in turn is connected to a slider 10 having a generally inverted U-shaped section through an engaging pin member 15. The cam groove 9a of the cam member 9 is so disposed as to accommodate the engaging pin member 15 so as to be slidable along the cam groove 9a thereof. To an upper portion of the slider 10 is mounted the engaging pin member 15 which in turn is so disposed as to protrude toward the cam groove 9a until an end portion of the engaging pin member 15 passes through the cam groove 9a of the cam member 9. The engaging pin member 15 is provided at its end portion with a snap ring 16 which allows the slider 10 to be connected to the mounting bracket 7. The engagement relationship between the engaging pin member 15 and the cam groove 9a of the cam member 9 constitutes a tilt mechanism for tilting the forward end portion of the flexible top 3 upwards at an early stage of opening the roof opening 2a and, at the same time, a mechanism for fully closing the forward end portion of the flexible top 3 in a manner as will be described hereinafter.

The support section 7b of the mounting bracket 7 has a guide shoe 22 at a lower end portion on its rearward side, and the guide shoe 22 is slidably disposed within an outer guide groove 5a (a second guide rail) of the guide rail 5. On the other hand, the support section 7b of the mounting bracket 7 has another guide shoe 23 at a lower end portion on its forward side, which is so disposed as to be slidably guided upward and backwards on an inclined surface 5e of the guide rail 5 and then on an upper surface 5f thereof. By slidably guiding the guide shoe 23 backwards on the upper surface 5f of the guide rail 5 subsequent to passage through the inclined surface 5e thereof, on the one hand, the forward end portion of the flexible top 3 is displaced or tilted upwards while being transferred backwards. By slidably guiding the guide shoe 23 from the upper surface 5f of the guide rail downwards and forwards to the guide groove 5a through the inclined surface 5e thereof, on the other hand, the flexible top 3 is transferred forwards and the forward end portion of the flexible top 3 is caused to be displaced downwards so as to lie in an approximately horizontal position, thereby enabling the forward end portion of the flexible top 3 to fully close the forward portion of the roof opening 2a of the roof 2.

As shown in FIG. 3, the guide rail 5 has an inner guide rail section 5b (a first guide rail) which is so disposed as to slidably accommodate a guide shoe 24 which in turn is connected to a lower inner portion of the slider 10. To a lower outer portion of the slider 10 is further fixed a guide bracket 11 so as to correspond to the guide rail 5, and the guide bracket 11 is connected at its lower end portion to a forward driving wire 12 disposed and accommodated within an outer groove 5c formed on the outer side of the guide rail 5.

Figure 6:
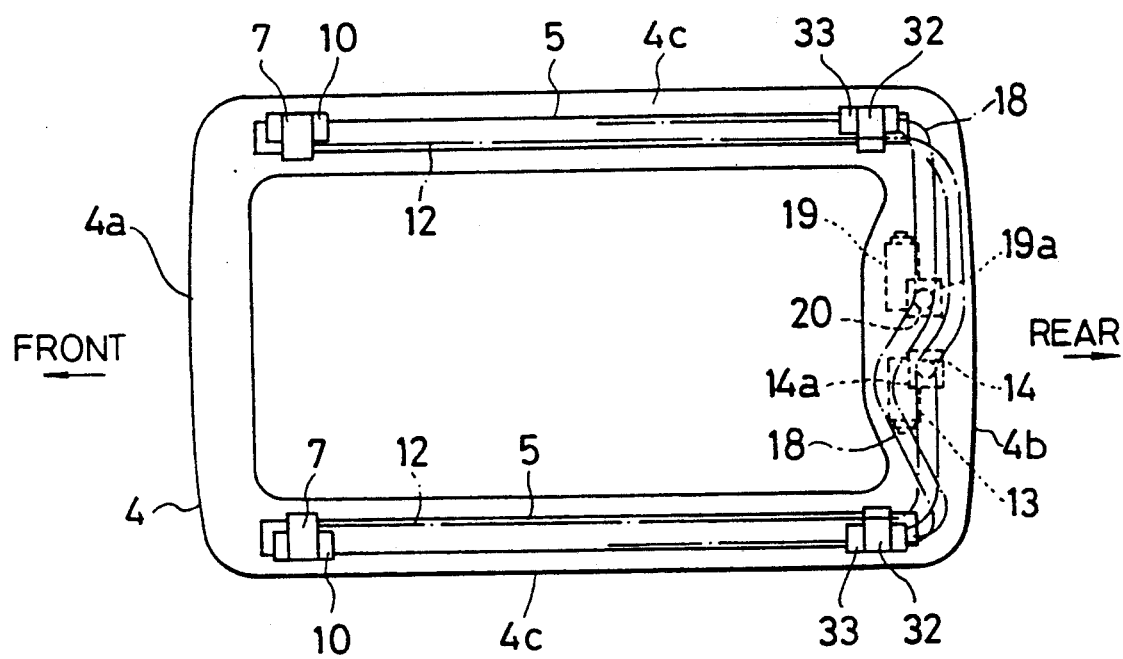
FIG. 6 is a top view showing a frame member to which a driving motor is mounted.

Referring now to FIG. 6, the driving wire 12 is so disposed to be in mesh with a gear 14 which in turn is rotatable by a first driving motor 13 located at an approximately central portion on the left side of a rear side portion 4b of the frame member 4. Further, the driving wire 12 is disposed to extend into a cable accommodation portion 41a formed on the outer side of a forward idle cable accommodation section 41 on the lower side of the opposite guide rail 5. The forward idle-cable accommodation section 41 is so designed as to accommodate an idle portion of the forward driving wire 12 on the front side of the vehicle body. This arrangement of the forward driving wire 12 allows the flexible top 3 to be opened at its forward end portion by rotation of the first driving motor 13, thereby opening the forward portion of the roof opening 2a of the roof 2.

Description will now be made of the operation of tilting the forward end portion of the flexible top 3 upwards in conjunction with FIG. 2. When the forward portion of the roof opening 2a is opened, the slider 10 is first transferred backwards to thereby allow the engaging pin member 15 to move along the cam groove 9a of the cam member 9a to the right in FIG. 2 and, when the engaging pin member 15 starts transferring downwards along the inclined groove section 9c, a forward end portion of the mounting bracket 7 is caused to arise up or be lifted gradually due to the action of engaging the engaging pin member 15 with the inclined groove section 9c, thereby allowing the forward plate member 6 and eventually the forward end portion of the flexible top 3 to be tilted upwards and, as a consequence, opening the forward portion of the roof opening 2a of the roof 2. The forward plate member 6 is tilted upwards by transferring the guide shoe 23 associated with the front edge of the mounting bracket 7 backwards on the inclined surface 5e of the guide rail 5 and thereafter on the horizontal upper surface 5f thereof. While the guide shoe 23 is being transferred backwards on the upper surface 5e of the guide rail 5, the flexible top 3 is transferred backwards, too, with its forward end portion tilted upwards, thereby folding the forward end portion of the flexible top 3.

Figure 5:
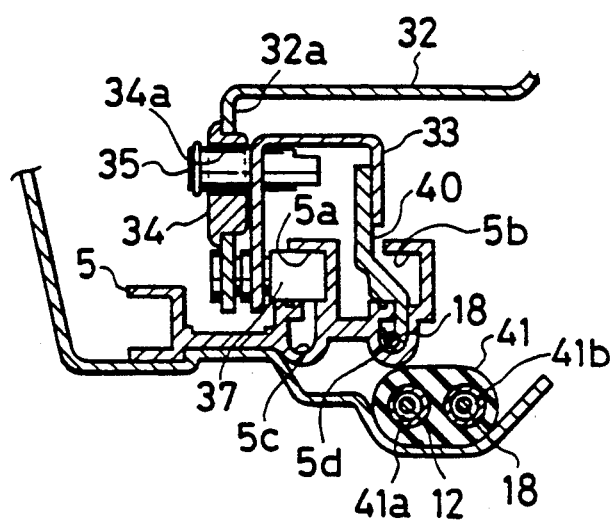
FIG. 5 is a sectional view showing the rearward portion of the flexible top vehicle, when taken along the line V—V of FIG. 4.
Figure 4:
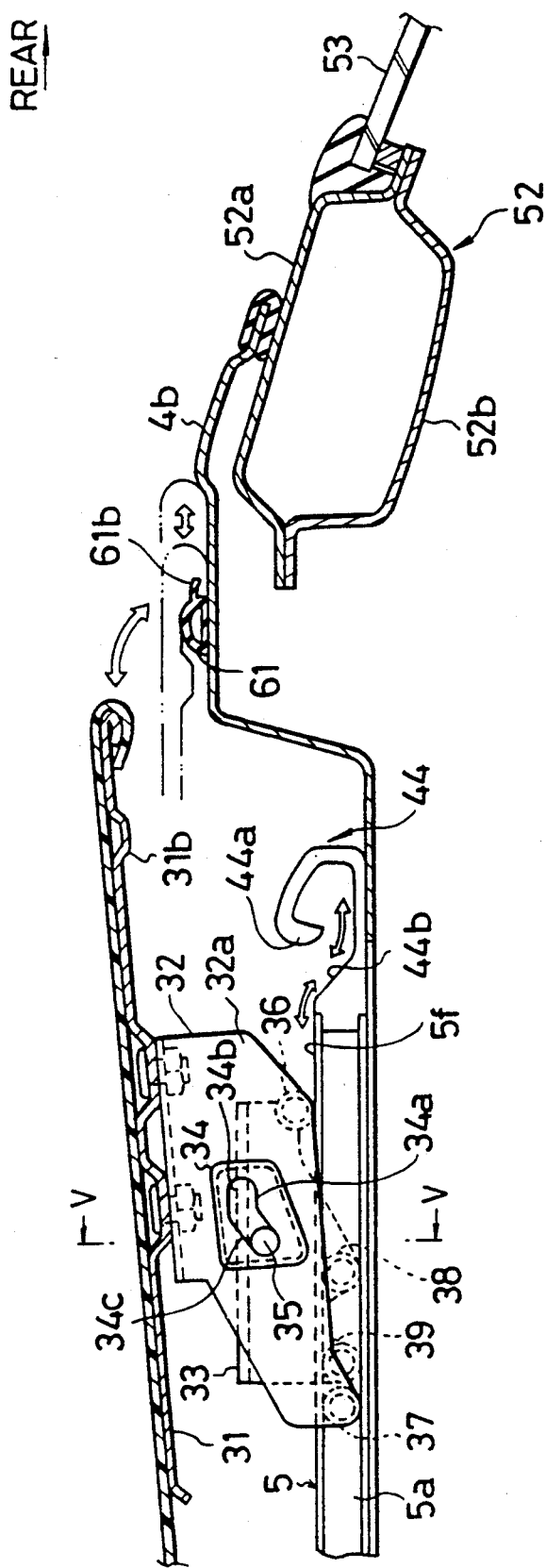
FIG. 4 is a sectional view showing the rearward portion of the flexible top vehicle, like FIG. 2.

The rearward portion of the flexible top 3 has substantially the same construction as the forward portion thereof as described hereinabove and the rearward end portion of the flexible top 3 is tilted upwards and displaced in a forward direction, thereby opening a rearward end portion of the roof opening 2a. As shown in FIGS. 4 and 5, a rearward plate member 31 is fixed to the rearward end portion of the flexible top 3 to which a mounting bracket 32 in turn is fixed. This connection is made by engaging the engaging pin member 35 secured to the mounting bracket 32 with the cam groove 34a (cam member 34) so disposed as to slidably accommodate the engaging pin member 35. The cam groove 34a of the rearward cam member 34 comprises a horizontal groove section 34b extending in an approximately horizontal direction and an inclined groove section 34c extending in a diagonally forward and downward direction in a manner opposite to the cam groove 9a of the forward cam member 9. To the mounting bracket 32 are mounted a guide shoe 36 and a guide shoe 37, the guide shoe 36 being so mounted as to transfer on an inclined surface 44b of a lock member 44 disposed to be inclined downwards and rearwards and then on the upper surface 5f of the guide rail 5 and the guide shoe 37 being so mounted as to transfer within an outer guide groove 5a formed in the guide rail 5. To the slider 33 are mounted guide shoes 38 and 39 which are so disposed as a to be transferred within and along an inner guide groove 5b formed in the guide rail 5.

A rearward driving wire 18 to be connected through a guide bracket 40 to the slider 33 serving as tilting the rearward plate member 31 upwards and opening the rearward end portion of the roof opening 2a is disposed within an inner accommodation groove 5d of the guide rail 5. The rearward driving wire 18 is so disposed as to be in mesh with a gear 20 rotatable by a second driving motor 19 located in an approximately central position of the frame member 4 on the right side thereof and as to extend within a rearward idle-cable accommodation portion 41b formed on an inner side of a cable accommodation member 41 located on a lower side of the opposite guide rail 5. The rearward driving wire 18 is operatively driven by rotation of the second driving motor 19.

Figure 7:
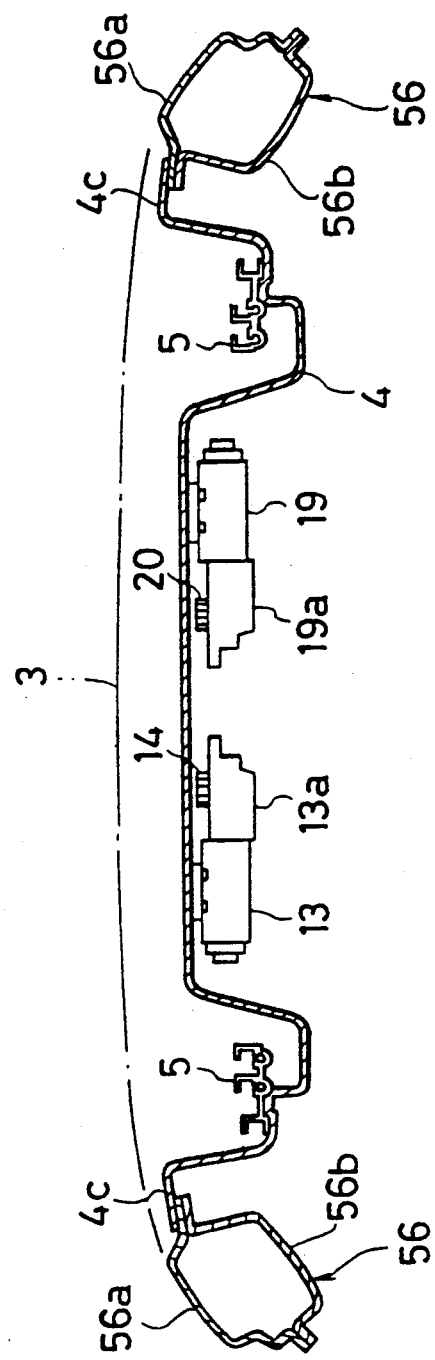
FIG. 7 is a sectional view showing a portion to which the driving motors are mounted.

Both the first and second driving motors 13 and 19 are disposed in an approximately central position on the left-hand and right-hand rearward portion of the frame member 4 in order to reduce an opening area on the forward side of the roof opening 2a. Both the first and second driving motors 13 and 19 are mounted to a rear surface of the frame member 4, as shown specifically in FIG. 7.

Figure 8:
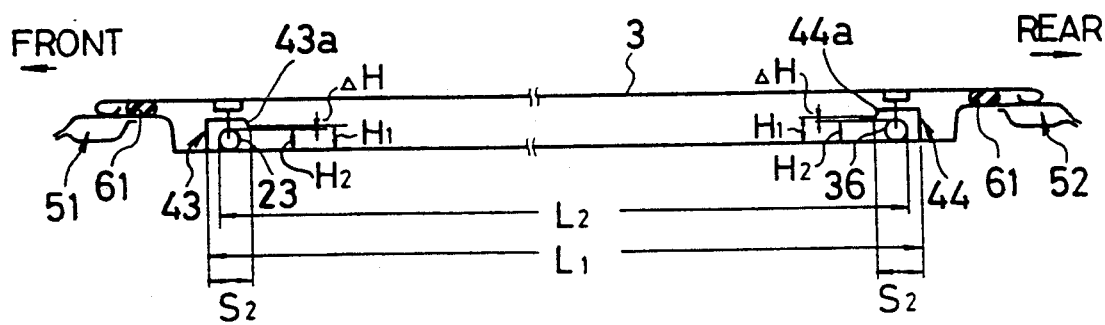
FIG. 8 is a diagrammatic representation of an outline of the present invention.

Both the left-hand and right-hand guide rails 5 and 5 have a forward stopper 43 at each of their front end portions and a rearward stopper 44 at each of their rear end portions. These stoppers 43 and 44 are disposed in a predetermined distance in the longitudinal direction of the vehicle body. In other words, the distance between the forward stopper 43 and the rearward stopper 44 is set to be longer than a maximum length of the extended flexible top 3 when it is expanded to its longest possible length in such a state as fully closing the roof opening 2a of the roof 2. Further, as shown specifically in FIG. 8, the distance between the forward and rearward stoppers 43 and 44, as indicated by symbol L1, is set to be longer than a distance between the guide shoes 23 and 36 when the flexible top 3 is in a state of being full closed. With this arrangement, even if the forward end portion of the flexible top 3 would be closed first or if the rearward end portion thereof would be closed first, the flexible top 3 in a state of fully closing the roof opening 2a is so constructed as to be expanded to its maximum extended length. In other words, the difference between the distances L1 and L2 (L1>L2) is preset to serve as a margin and the margin is so arranged as to absorb an extension of the flexible top 3 to be caused by a rise of the ambient temperature or by other causes.

Further, as shown in FIG. 2, the forward stopper 43 has a forward claw section 43a extending downwards so as to become engaged with and lock the forward end portion of the flexible top 3, thereby functioning as a forward lock mechanism, while the rearward stopper 44 has a rearward claw section 44a extending downwards so as to become engaged with and lock the rearward end portion of the flexible top 3, thereby functioning as a rearward lock mechanism. For example, as shown in FIG. 2, the claw section 43a is so disposed as to be located in a distance by S2 away from an inner edge of the forward stopper 43, and this distance S2 is set to be longer than a diameter H2 of the slider 23. Likewise, the claw section 44a is disposed by S2 away from an inner edge of the rearward stopper 44. More specifically, the guide shoe 23 located at the forward end portion of the flexible top 3 is engaged with the forward claw section 43a, thereby locking the forward end portion of the flexible top 3, while the guide shoe 36 located at the rearward end portion of the flexible top 3 is engaged with the rearward claw section 44a, thereby locking the rearward end portion of the flexible top 3. Both the forward claw section 43a and the rearward claw section 44a are so designed as to lock either of the guide shoe 23 or 36 whichever abutted with either of the groove section 43a or 44a first. More specifically, for instance, when the forward end portion of the flexible top 3 is closed first and the guide shoe 23 is brought into abutment with the forward stopper 43, the tension acts rearwards upon the forward end portion of the flexible top 3 when the rearward end portion of the flexible top 3 is closed later. This tension acts upwards upon the engaging pin member 15 due to the tension of the flexible top 3, so that the forward plate member 6 and, eventually, the forward end portion of the flexible top 3 are allowed to pivot upwards about the engaging pin member 15, thereby engaging the guide shoe 23 with the forward claw section 43a of the forward stopper 43 and locking the guide shoe 23.

It is to be noted herein that the horizontal groove section 9b of the cam groove 9a is so disposed as to have a height dimension l1 which is somewhat greater than a diametrical dimension l2, as shown in FIGS. 2 and 3. In other words, there is provided a clearance between the engaging pin member 15 and the horizontal groove section 9b. Further, a height H1 of an edge of the forward claw section 43a from an upper and inner surface of the forward stopper 43, i.e., a height H1 of an opening of the forward claw section 43a, is set to be somewhat larger than a diametrical dimension H2 of the guide shoe 23. Hence, the difference $\Delta h$ ($\Delta h = H1 - H2$) is set to be smaller than the difference $\Delta l$ ($\Delta l = l1 - l2$).

The forward claw member has an edge facing the first forward guide shoe and having a clearance (H1) approximately as long as a width (H2) of the first forward guide shoe between the edge of the claw member and the lower guide surface of the second guide rail. The rearward locking mechanism has a rearward claw member having an edge facing the first rearward guide shoe and having a clearance (H1) approximately as long as a width (H2) the second rearward guide shoe between the edge of the second claw member and the lower guide surface of the second guide rail.

With this arrangement, as the rearward end portion of the flexible top 3 is closed, the forward end portion thereof is allowed to be displaced upwards to some extent by the difference $\Delta l$, thereby enabling the guide shoe 23 to be engaged with the forward claw section 43a of the forward stopper 43. The engagement of the guide shoe 23 with the forward claw section 43a can prevent the forward end portion of the flexible top 3 from opening due to the tension acting rearwards upon the flexible top 3 in association with the operation of closing the rearward end portion of the flexible top 3, when the forward end portion thereof is closed first and the rearward end portion thereof is closed thereafter. On the contrary, when the forward end portion of the flexible top 3 is opened, a driving force is produced by the driving cable 12 and acts downward of the engaging pin member 15 so that the guide shoe 23 is caused to be displaced downwards from the forward claw section 43a of the forward stopper 43, thereby disengaging the guide shoe 23 from the forward claw section 43a. Therefore, as shown in FIG. 2, the guide shoe 23 is allowed to be released from the forward stopper 43 and then to be transferred in a rearward direction. The backward transfer of the guide shoe 23 enables a smoothly backward transfer of the forward end portion of the flexible top 3, thereby opening the forward end portion of the roof opening 2a.

It is to be noted herein that no diagrammatic illustration is made in the accompanying drawings on a specific construction between the forward plate member 6 and the rearward plate member 31 yet it is to be understood that a folding mechanism as shown and described in U.S. Pat. No. 2,103,372 may be disposed therebetween so as to fold or extend an intermediate portion of the flexible top 3.

As shown in FIG. 2, a forward portion 4a of the frame member 4 is mounted to the front header 51 of a closed-sectional structure comprising an upper panel section 51a and a lower panel section 51b. The forward portion 4a of the frame member 4 is so disposed as to extend rearwards from the front header 51 and to be covered with the forward end portion of the flexible top 3, or the forward plate member 6. A sealing member 61 having a lip section 61a is disposed on the forward portion 4a of the frame member 4 and it is so designed as to allow the sealing member 61 and the lip section 61a thereof to become in tight abutment with the lower surface of a protrusion section 6b of the forward plate member 6 to thereby tightly closing the forward end portion of the flexible top 3 and, as a consequence, ensuring full sealing performance. In FIG. 2, reference numeral 54 denotes a front window glass panel.

As shown in FIG. 4, a rearward portion 4b of the frame member 4 has substantially the same construction and it is operated in substantially the same manner as the forward portion 4a of the frame member 4. The rearward portion 4b thereof is mounted to the rear header 52 of a closed cross-sectional structure comprising an upper panel 52a and a lower panel 52b. Likewise, a sealing member 61 having a lip section 61b and being continuously connected to the sealing member 61 disposed on the forward portion of the frame member 4 so as to surround the roof opening 2a of the roof 2 is mounted on the rearward portion of the frame member 4, thereby allowing a protrusion portion 31b of the rearward plate member 31 to become abutted with an upper surface of the sealing member 61 and the rearward end portion of the rearward plate member 31 to become engaged with the lip section 61b of the sealing member 61, when the rearward end portion of the flexible top 3 is fully closed, thereby ensuring sealing performance between the rearward plate member 31 and the sealing member 61. In FIG. 4, reference numeral 53 denotes a rear window glass panel.

Referring now to FIG. 3, each side portion 4c of the frame member 4 is connected to an extension member 57 fixed to the outer roof rail 56a of a roof rail 56 of a closed cross-sectional structure comprising the outer roof rail 56a and an inner roof rail 56b.

For instance, when the forward portion of the roof opening 2a is opened by opening the front portion of the flexible top 3, a switch (not shown) is shifted to an opening state for opening the front portion of the flexible top 3, and thereby driving the first driving motor 13 and, as a consequence, tilting the front portion of the flexible top 3 upwards while transferring it in a rearward direction of the body. More specifically, the first driving motor 13 is driven to operate the driving wire 12, thereby transferring the slider 10 backwards to a small extent and allowing the engaging pin member 15 to transfer the horizontal groove section 9b of the cam groove 9a of the cam member 9 to the inclined groove section 9c. As the engaging pin member 15 is suppressed from deviating in a vertical direction thereof, the front side portion of the mounting bracket 7 is displaced upwards. In other words, the guide shoe 22 located on the rearward side of the mounting bracket 7 is located within the guide groove 5a of the guide rail 5, while the guide shoe 23 located on the forward side of the mounting bracket 7 is caused to transfer onto the upper surface 5f of the guide rail 5 from the inclined surface 5e thereof, thereby tilting the forward plate member 6 upwards and consequently rising the forward end portion of the flexible top 3 up to a position higher than the roof 2, because the mounting bracket 7 is fixed to the forward plate member 6 through the mounting sections 6a and 6b.

After the forward plate member 6 has been tilted upwards, the switch for opening the forward end portion of the flexible top 3 is kept on being in an opening state to further drive the driving motor 13. Thus, the forward plate member 6 is transferred backwards in such a state in which it has been tilted upwards, while folding the forward portion of the flexible top 3 together with the slider 10, thereby opening the forward end portion of the roof opening 2a of the roof. Then, when the forward end portion of the roof opening 2a is full open, the driving motor 13 is brought into a locked state.

When the flexible top 3 is closed, the switch is shifted to a closing state to drive the first driving motor 13, thereby allowing the forward end portion of the flexible top 3 to transfer in a forward direction in such a state that the engaging pin member 15 is located at a front end of the horizontal groove section 9b of the flexible top 3. Then, when the forward end portion of the flexible top 3 approaches a position in the vicinity of the forward end of the roof opening 2a of the roof 2, the switch is shifted again to a closing state and the first driving motor 13 is driven, thereby transferring the guide shoe 23 downwards from the upper surface 5f of the guide rail 5 through the inclined surface 5e thereof to a state in which the forward end portion of the flexible top 3 is tilted downwards to an approximately horizontal position. This operation causes the guide shoe 23 to become equal in height to the guide shoe 22, thereby releasing the tilted-up state of the flexible top 3. When the flexible top 3 has been tilted downwards, the front edge of the flexible top 3 is located in a position forward of the sealing member 61 disposed to some extent on the forward portion of the frame member 4, as shown by the dotted line indicated by reference symbol P1 in FIG. 2. In other words, the forward end portion of the flexible top 3 at the position P1 is caused to be tightly abutted with the sealing member 61, thereby ensuring high sealing performance and providing a full closed state for the roof opening 2a of the roof 2 and the flexible top 3. Thereafter, the forward end portion of the flexible top 3 is caused to be transferred forwards to a little extent until it lies in a position as indicated by reference symbol P2 in FIG. 2, while maintaining the state in which the forward end portion of the flexible top 3 is fully closed, thereby fully closing the roof opening 2a of the roof 2. When this is described from the side of the guide rail 5, the distance S1 as indicated in FIG. 2 corresponds to the distance between the start point P1 at which the forward end portion of the flexible top 3 starts closing the forward portion of the roof opening 2a and the end point P2 at which the former has fully closed the latter.

On the other hand, the rearward end portion of the flexible top 3 is opened or closed in substantially the same manner as the forward end portion thereof as described in detail hereinabove by operation of another switch (not shown) for opening or closing the rearward end portion of the flexible top 3.

The forward sliding member is so disposed as to be slidable in a farther forward direction by a predetermined stroke (S1) after the forward end portion of the flexible top comes into tight abutment with the forward sealing member 61, thereby assuming the forward closed state and as to be received by the forward stopper when the forward end portion of the flexible top is transferred by the predetermined stroke (S1) in a state of closing the forward portion of said roof opening. The rearward sliding member is so disposed as to be slidable in a farther rearward direction by a predetermined stroke (S1) after the rearward end portion of said flexible top comes into tight abutment with said rearward sliding means, thereby assuming said rearward closed state, and as to be received by the rearward stopper when the rearward end portion of said flexible top is transferred by the predetermined stroke (S1) in a state of closing the rearward portion of the roof opening.

When the switch is shifted to an opening state, the second driving motor 19 is driven to thereby tilt upwards and fold the rearward end portion of the flexible top 3 in substantially the same manner as described hereinabove on the forward end portion thereof, because the rearward plate member 31 located at the rearward end portion of the flexible top 3 advances together with the rearward end portion thereof due to a forward movement of the sliders 33 and 33. The folding of the rearward end portion of the flexible top 3 opens the rearward end portion of the roof opening 2a of the roof 2, thereby providing passengers seated on a rear set with a wider uproar view and open feeling.

As described hereinabove, the first driving motor 13 operatively drives the driving wire 12 independently and separately from the other driving wire 18 to be so disposed as to be operatively driven by the second driving motor, thereby transferring the left-hand and right-hand sliders 10 and 10 and as a consequence the forward end portion of the flexible top 3. On the other hand, the second driving motor 19 operatively drives the driving wire 18 to thereby transfer the left-hand and right-hand sliders 33 and 33 and consequently the rearward end portion of the flexible top 3 in such a manner as independently and separately from the forward end portion thereof.

Figure 9:
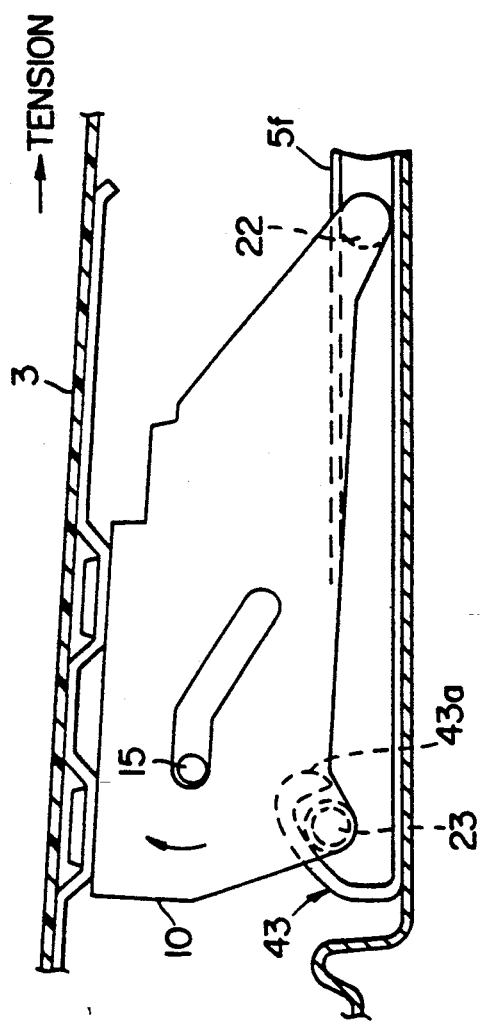
FIG. 9 is a sectional view showing the forward end portion of the flexible top vehicle in a locked position.

FIG. 9 shows the forward end portion of the flexible top vehicle in a locked position where guide shoe 23 is engaged with the claw portion 23a of the forward stopper 43.

The following is a description of the operation when both of the forward end portion and the rearward end portion of the flexible top 3 are in an opened state. In this instance, when the forward end portion of the flexible top 3 is closed first, it is transferred forwards until the guide shoe 23 of the forward end portion of the flexible top 3 is brought into abutment with the forward stopper 43 in the manner as described hereinabove, thereby closing the forward end portion of the roof opening 2a of the roof 2 prior to the rearward end portion thereof.

Thereafter, in order to close the rearward end portion of the roof opening 2a of the roof 2, the rearward end portion of the flexible top 3 is transferred backwards until the rear edge of the flexible top 3 comes into abutment with the rearward seal 61. The backward transfer of the rearward end portion of the flexible top 3 creates the tension of pulling the forward end portion of the flexible top 3 toward the rear of the vehicle body, and this tension acts upwards upon the engaging pin member 15, thereby consequently pivoting the forward end portion of the flexible top 3 (the forward plate member 6) upwards about the engaging pin member 15. As a result, the guide shoe 23 located at the forward end portion of the flexible top 3 is allowed to be engaged with the claw portion 43a of the forward stopper 43 as shown in FIG. 9, thereby preventing the forward end portion of the flexible top 3 from being pulled backwards and the forward portion of the roof opening 2a from being opened again. On the other hand, the rearward end portion of the flexible top 3 is brought into such a state of closing the rearward portion of the roof opening 2a. In this instance, in order to regulate farther forward and rearward transfer of the forward end portion and the rearward end portion of the flexible top 3, respectively, the longitudinal distance between the forward stopper 43 and the rearward stopper 44 is set to be longer than a maximum length (L1>L2) of the flexible top 3 when the flexible top 3 is extended to the longest possible extent that closes the roof opening 2a of the roof 2. It is to be noted herein that the length L2 indicative of the maximum extended length of the flexible top 3, at referred to immediately hereinabove, is set as a value that is longer than (L1-S1). Therefore L2>L1-S1. Also the distance L2 between the forward guide shoe of the forward bracket and the rearward guide shoe of the rearward bracket when the flexible top is extended to its maximum length is longer than a length obtained at least by subtracting the predetermined stroke length dimension S1 for allowing one end portion of the flexible top to maintain its closed state and a distance S2 between the forward locking mechanism and the forward stopper or between the rearward locking mechanism and the rearward stopper from a distance L1 between the forward stopper and the rearward stopper (L2>L1-S1-S2).

When the forward end portion of the flexible top 3 in a locked state is opened, the driving force to be applied by the driving cable 12 is caused to act upon the engaging pin member 15 downwards, thereby allowing the guide shoe 23 locked with the claw portion 43a of the forward stopper 43 to be released from its locked state by disengaging the guide shoe 23 from the claw portion 43a thereof and consequently the forward end portion of the flexible top 3 to be smoothly transferred backwards to open the forward portion of the roof opening 2a of the roof 2.

When the rearward end portion of the flexible top 3 in a locked state is opened, the operation is carried out to close the rearward end portion of the roof opening 2a of the roof 2 in the manner as described hereinabove.

Although the present invention has been described in connection with the preferred embodiments thereof with reference to the accompanying drawings which are used only for the purpose of illustration, not limitation, those skilled in the art will readily conceive numerous changes and modifications within the framework of obviousness upon the reading of the specification presented herein of the present invention. Accordingly, such changes and modifications are, unless they depart from the spirit and scope of the present invention as delivered from the claims annexed hereto, to be construed as included therein.

What is claimed is:

1. A flexible top vehicle having a roof with a roof opening formed therein and surrounded by a front header, rear header and roof sides; and a flexible top made of a flexible material and disposed at the roof opening; wherein the flexible top is disposed so that it can assume a full close state in which the roof opening is fully covered with the flexible top by extending the flexible top to its full extended length in a longitudinal direction of a vehicle body and an open state in which the roof opening is partially opened by folding the flexible top in the longitudinal direction thereof so that the flexible top is disposed away from said front header and said rear header; comprising:

a first guide rail extending in the direction longitudinal to the roof sides;

a forward sliding member disposed at a forward end portion of said flexible top so as to be slidably transferable in the longitudinal direction thereof by guidance of said first guide rail;

a rearward sliding member disposed at a rearward end portion of said flexible top so as to be slidably transferable in the longitudinal direction thereof by guidance of said first guide rail;

a forward stopper means disposed at a front end of said first guide rail for receiving said forward sliding member and allowing the forward end portion of said flexible top to assume a forward closed state in which a forward portion of said roof opening is covered with the forward end portion of said flexible top;

a forward locking mechanism disposed at said forward stopper means and being capable of locking said forward sliding member by means of tension acting on the top in the direction to the rear of the vehicle when the forward sliding member is abutted with the forward stopper means;

a rearward stopper means disposed at a rear end of said first guide rail for receiving said rearward sliding member and allowing the rearward end portion of said flexible top to assume a rearward closed state in which a rearward portion of said roof opening is covered with the rearward end portion of said flexible top;

a rearward locking mechanism disposed at said rearward stopper means and being capable of locking said rearward sliding member by means of tension acting on the top in the direction to the front of the vehicle when the rearward sliding member is abutted with the rearward stopper means;

a driving means for driving said forward sliding and said rearward sliding member in said first guide rail;

a forward lifting mechanism and a rearward lifting mechanism, said forward lifting mechanism being disposed between a forward end portion of said first guide rail and the forward end portion of said flexible top, said forward lifting mechanism having a forward portion capable of assuming a tilted-up state in which the forward portion of said forward lifting mechanism and the forward end portion of said flexible top are tilted forwardly and upwardly in said forward closed state;

and said rearward lifting mechanism being disposed between a rearward end portion of said first guide rail and the rearward end portion of said flexible top, said rearward lifting mechanism having a rearward portion capable of assuming a tilted-up state in which the rearward portion of said rearward lifting mechanism and the rearward end portion of said flexible top are tilted rearwardly and upwardly in said rearward closed state;

wherein a distance (L1) between the forward stopper means and said rearward stopper means is longer than a maximum distance (L2) between said forward sliding member and said rearward sliding member when said flexible top is extended to its longest possible extent enough to cover said roof opening.

2. A flexible top vehicle as claimed in claim 1, wherein said flexible top comprises a forward plate member comprised of a hard material and disposed at the forward end portion thereof and a rearward plate member comprised of a hard material and disposed at the rearward end portion thereof.

3. A flexible top vehicle as claimed in claim 2, further comprising:

a forward sealing means so disposed at said front header as to extend in a transverse direction of the vehicle body; and a rearward sealing means so disposed at said rear header as to extend in a transverse direction of the vehicle body;

wherein said forward sealing means is for sealing between the front header and the forward end portion of the top by a tight abutment of the front header to the forward end portion of said top when the forward end portion of said flexible top assumes said forward closed state; and said rearward sealing means is for sealing between the rear header and the rearward end portion of the top by a tight abutment of the front header to said rearward end portion of said flexible top when the rearward end portion of said flexible top assumes said rearward closed state.

4. A flexible top vehicle as claimed in claim 3, wherein:

said forward sliding member is so disposed as to be slidable in a farther forward direction by a predetermined stroke (S1) after said forward end portion of said flexible top comes into tight abutment with said forward sealing means, thereby assuming said forward closed state and as to be received by said forward stopper means when the forward end portion of said flexible top is transferred by said predetermined stroke (S1) in a state of closing the forward portion of said roof opening;

said rearward sliding member is so disposed as to be slidable in a farther rearward direction by a predetermined stroke (S1) after said rearward end portion of said flexible top comes into tight abutment with said rearward sealing means, thereby assuming said rearward closed state and as to be received by said rearward stopper means when the rearward end portion of said flexible top is transferred by said predetermined stroke (S1) in a state of closing the rearward portion of said roof opening.

5. A flexible top vehicle as claimed in claim 4, wherein said maximum distance (L2) between said forward sliding member and said rearward sliding member is greater than the difference between said distance (L1) and said predetermined stroke (S1).

6. A flexible top vehicle as claimed in claim 3, wherein said forward sliding member is so disposed as to be slidable in a farther forward direction by a predetermined stroke (S1) after said forward end portion of said flexible top comes into tight abutment with said forward sealing means, thereby assuming said forward closed state and as to be received by said forward stopper means when the forward end portion of said flexible top is transferred by said predetermined stroke (S1) in a state of closing the forward portion of said roof opening;

said driving means further comprising:
a first driving motor so disposed as to be associated with said forward sliding member for transferring said forward sliding member in the longitudinal direction of the vehicle body; and
a second driving motor so disposed as to be associated with said rearward sliding member for transferring said rearward sliding member in the longitudinal direction of the vehicle body;
wherein said forward sliding member is so mounted to the forward end portion of said flexible top as to be relatively displaceable forwards or rearwards by said predetermined stroke so as to assume said closed state or said tilted-up state while said forward sliding member is displaced in the longitudinal direction thereof relative to said flexible top; and
said rearward sliding member is so mounted to the rearward end portion of said flexible top as to be relatively displaceable forwards or rearwards by said predetermined stroke so as to assume said closed state or said tilted-up state while said rearward sliding member is displaced in the longitudinal direction thereof relative to said flexible top.

7. A flexible top vehicle as claimed in claim 6, said forward lifting mechanism further comprising:
a forward bracket so disposed at the forward end portion of said flexible top as to extend downwards;
a cam groove disposed on one of said forward bracket and said forward sliding member;
a forward pin means so disposed at the other one of said forward bracket and said forward sliding member as to pass through said cam groove;
wherein said forward sliding member is so disposed as to be displaceable forwards and rearwards relative to said forward bracket by said predetermined stroke;
said rearward lifting mechanism further comprising:
a rearward bracket so disposed at the rearward end portion of said flexible top as to extend downwards;
a cam groove disposed on one of said rearward bracket and said rearward sliding member; and
a rearward pin means so disposed at the other one of said rearward bracket and said rearward sliding member as to pass through said cam groove;
wherein said rearward sliding member is so disposed as to be displaceable forwards and rearwards relative to said forward bracket by said predetermined stroke.

8. A flexible top vehicle as claimed in claim 7, wherein:
said first guide rail further comprises a second guide rail comprising an upper guide surface, a lower guide surface and inclined surfaces so disposed at forward and rearward end portions of the second guide rail as to communicate said upper guide surface with said lower guide surface; and
said forward bracket further comprising:
a first forward guide shoe and a first rearward guide shoe disposed apart from one other at a lower end of said forward bracket; and
said rearward bracket further comprising:
a second forward guide shoe and a second rearward guide shoe disposed apart from one another at a lower end of said rearward bracket,
wherein said first rearward guide shoe and said second forward guide shoe are so disposed as to be transferable in the longitudinal direction of the vehicle body along the lower guide surface of said second guide rail;
said first forward guide shoe and said second rearward guide shoe are so disposed as to be transferable in the longitudinal direction of the vehicle body along the upper guide surface of said second guide rail and as to be transferable at both of the forward and rearward end portions of said second guide rail along said inclined surfaces;
said flexible top assumes said tilted-up state when said first forward guide shoe is transferred on the upper guide surface of said second guide rail or when said second rearward guide shoe is transferred on the upper guide surface of said second guide rail; and
said flexible top assumes said closed state when said first forward guide shoe is transferred on the lower guide surface of said second guide rail or when said second rearward guide shoe is transferred on the lower guide surface of said second guide rail.

9. A flexible top vehicle as claimed in claim 8, wherein:
said first forward guide shoe of said forward bracket is disposed in a position underneath and forward of said forward pin means; and
said second rearward guide shoe of said rearward bracket is disposed in a position underneath and rearward of said rearward pin means.

10. A flexible top vehicle as claimed in claim 9, wherein:
a portion of said forward sliding member is disposed underneath said forward pin means and is operatively connected with said first driving motor; and
a portion of said rearward sliding member is disposed underneath said rearward pin means and is operatively connected with said second driving motor.

11. A flexible top vehicle as claimed in claim 10, wherein:
said forward locking mechanism comprises a first claw member having an edge facing said first forward guide shoe and having a first clearance (H1) approximately as long as a first width (H2) of said first forward guide shoe, said first clearance (H1) being measured between said edge of said first claw member and the lower guide surface of said second guide rail; and
said rearward locking mechanism comprises a second claw member having an edge facing said second rearward guide shoe and having a second clearance (H1) approximately as long as a second width (H2) of said second rearward guide shoe, said second clearance (H1) being measured between said edge of said second claw member and the lower guide surface of said second guide rail.

12. A flexible top vehicle as claimed in claim 11, wherein:
a first further clearance (S2) which is longer than the first width (H2) of said first forward guide shoe of said forward bracket is provided between said claw member constituting said forward locking mechanism and said forward stopper means; and a second further clearance (S2) which is longer than the second width (H2) of said second rearward guide shoe of said rearward bracket is provided between said claw member constituting said rearward locking mechanism and said rearward stopper means.

13. A flexible top vehicle as claimed in claim 12, wherein a distance (L2) between said forward guide shoe of said forward bracket and said rearward guide shoe of said rearward bracket when said flexible top is extended to its maximum length is longer than a length obtained at least by subtracting said predetermined stroke length dimension (S1) for allowing one end portion of said flexible top to maintain its closed state and a distance (S2) between said forward locking mechanism and said forward stopper means or between said rearward locking mechanism and said rearward stopper means from a distance (L1) between said forward stopper means and said rearward stopper means.

14. A flexible top vehicle having a roof with a roof opening formed therein and surrounded by a front header, rear header and roof sides; and a flexible top made of a flexible material and disposed at the roof opening; wherein the flexible top is disposed so that it can assume a full close state in which the roof opening is fully covered with the flexible top by extending the flexible top to its full extended length in a longitudinal direction of a vehicle body and an open state in which the roof opening is partially opened by folding the flexible top in the longitudinal direction thereof so that the flexible top is disposed away from said front header and said rear header; comprising:

a first guide rail extending in the direction longitudinal to the roof sides;

a forward sliding member disposed at a forward end portion of said flexible top so as to be slidably transferable in the longitudinal direction thereof by guidance of said first guide rail;

a rearward sliding member disposed at a rearward end portion of said flexible top so as to be slidably transferable in the longitudinal direction thereof by guidance of said first guide rail;

a forward stopper means disposed at a front end of said first guide rail for receiving said forward sliding member and allowing the forward end portion of said flexible top to assume a forward closed state in which a forward portion of said roof opening is covered with the forward end portion of said flexible top;

a forward locking mechanism disposed at said forward stopper means and being capable of locking said forward sliding member by means of tension acting on the top in the direction to the rear of the vehicle when the forward sliding member is abutted with the forward stopper means;

a rearward stopper means disposed at a rear end of said first guide rail for receiving said rearward sliding member and allowing the rearward end portion of said flexible top to assume a rearward closed state in which a rearward portion of said roof opening is covered with the rearward end portion of said flexible top;

a rearward locking mechanism disposed at said rearward stopper means and being capable of locking said rearward sliding member by means of tension acting on the top in the direction to the front of the vehicle when the rearward sliding member is abutted with the rearward stopper means;

a driving means for driving said forward sliding and said rearward sliding member in said first guide rail;

a forward lifting mechanism disposed between a forward end portion of said first guide rail and the forward end portion of said flexible top, said forward lifting mechanism having a forward portion capable of assuming a tilted-up state in which the forward portion of said forward lifting mechanism and the forward end portion of said flexible top are tilted rearwardly and upwardly in said rearward closed state; and wherein a distance (L1) between the forward stopper means and said rearward stopper means is longer than a maximum distance (L2) between said forward sliding member and said rearward sliding member when said flexible top is extended to its longest possible extent enough to cover said roof opening.

15. A flexible top vehicle having a roof with a roof opening formed therein and surrounded by a front header, rear header and roof sides; and a flexible top made of a flexible material and disposed at the roof opening; wherein the flexible top is disposed so that it can assume a full close state in which the roof opening is fully covered with the flexible top by extending the flexible top to its full extended length in a longitudinal direction of a vehicle body and an open state in which the roof opening is partially opened by folding the flexible top in the longitudinal direction thereof so that the flexible top is disposed away from said front header and said rear header; comprising:

a first guide rail extending in the direction longitudinal to the roof sides;

a forward sliding member disposed at a forward end portion of said flexible top so as to be slidably transferable in the longitudinal direction thereof by guidance of said first guide rail;

a rearward sliding member disposed at a rearward end portion of said flexible top so as to be slidably transferable in the longitudinal direction thereof by guidance of said first guide rail;

a forward stopper means disposed at a front end of said first guide rail for receiving said forward sliding member and allowing the forward end portion of said flexible top to assume a forward closed state in which a forward portion of said roof opening is covered with the forward end portion of said flexible top;

a forward locking mechanism disposed at said forward stopper means and being capable of locking said forward sliding member by means of tension acting on the top in the direction to the rear of the vehicle when the forward sliding member is abutted with the forward stopper means;

a rearward stopper means disposed at a rear end of said first guide rail for receiving said rearward sliding member and allowing the rearward end portion of said flexible top to assume a rearward closed state in which a rearward portion of said roof opening is covered with the rearward end portion of said flexible top;

a rearward locking mechanism disposed at said rearward stopper means and being capable of locking said rearward sliding member by means of tension acting on the top in the direction to the front of the vehicle when the rearward sliding member is abutted with the rearward stopper means;

a driving means for driving said forward sliding and said rearward sliding member in said first guide rail;

a rearward lifting mechanism disposed between a rearward end portion of said first guide rail and the rearward end portion of said flexible top, said rearward lifting mechanism having a rearward portion capable of assuming a tilted-up state in which the rearward portion of said rearward lifting mechanism and the rearward end portion of said flexible top are tilted rearwardly and upwardly in said rearward closed state; and wherein a distance (L1) between the forward stopper means and said rearward stopper means is longer than a maximum distance (L2) between said forward sliding member and said rearward sliding member when said flexible top is extended to its longest possible extent enough to cover said roof opening.

* * * * *